United States Patent [19]

Kielma et al.

[11] 3,840,981

[45] Oct. 15, 1974

[54] TOOL CHANGE ARM GRIP

[75] Inventors: Ervin J. Kielma, Milwaukee; John T. Currer, Waumatosa, both of Wis.

[73] Assignee: Kearney & Trecker Corporation, West Allis, Wis.

[22] Filed: Dec. 9, 1971

[21] Appl. No.: 206,346

[52] U.S. Cl................................. 29/568, 214/1 BD
[51] Int. Cl............................................ B23q 3/157
[58] Field of Search.......... 29/568, 26 A; 214/1 BD; 294/33, 90, 99 R, 224, 31.2, 31 R

[56] References Cited
UNITED STATES PATENTS

| | | | |
|---|---|---|---|
| 3,218,706 | 11/1965 | Zankl et al............................ | 29/568 |
| 3,242,568 | 3/1966 | Flannery et al....................... | 29/568 |
| 3,348,298 | 10/1967 | Sedgwick............................... | 29/568 |
| 3,384,953 | 5/1968 | Scheolucke........................... | 29/568 |
| 3,541,677 | 11/1970 | Fiegler.................................. | 29/568 |

*Primary Examiner*—Andrew R. Juhasz
*Assistant Examiner*—Z. R. Bilinsky
*Attorney, Agent, or Firm*—Cyril M. Hajewski; Donald E. Porter

[57] ABSTRACT

This invention relates to a greatly simplified tool gripping mechanism adapted to so cooperate with a tool changer as to positively and releasably secure a tool thereto during a tool changing operation. The tool changer comprises an arm presenting a semicircular tool engaging recess having associated lateral and axial tool clamps, and being laterally movable relative to the axis of a tool socket together with cooperating power operable means. The arrangement facilitates automatic power operable interchange of tools between a storage station and a laterally spaced apart operating station. To do this, the changer is first moved laterally to move its recess into laterally clamped engagement with the axis of a tool carried in one station and actuating resilient lateral clamp means associated therewith. After this, the changer is moved axially outward to withdraw the laterally clamped tool from its socket and actuate the axial tool clamp. Next, the outwardly withdrawn changer is moved laterally into axially realigned position with the spaced apart operating station, and moved axially inward to reinsert the realigned tool. Upon axial reinserting movement and subsequent return to parked position, the incidental power movements of the tool changer effects unclamping of the resilient axial and lateral tool clamps in reverse sequence to condition the changer and associated clamps for the next tool change operation.

16 Claims, 9 Drawing Figures

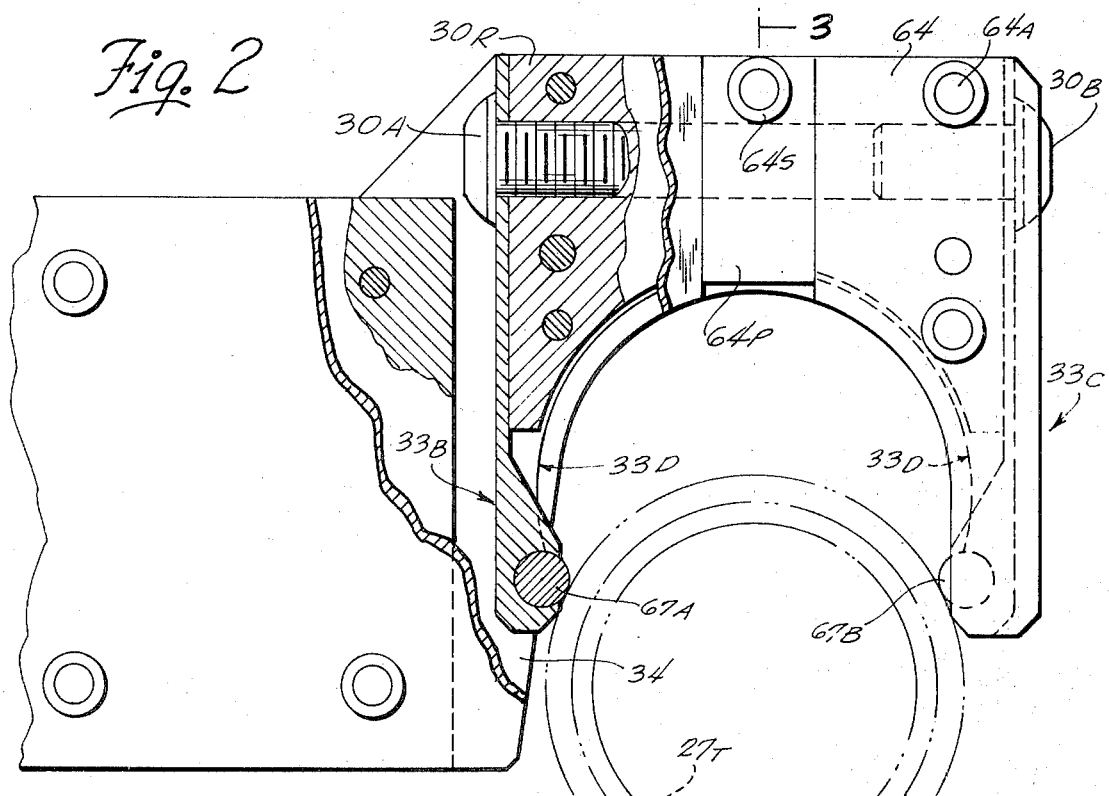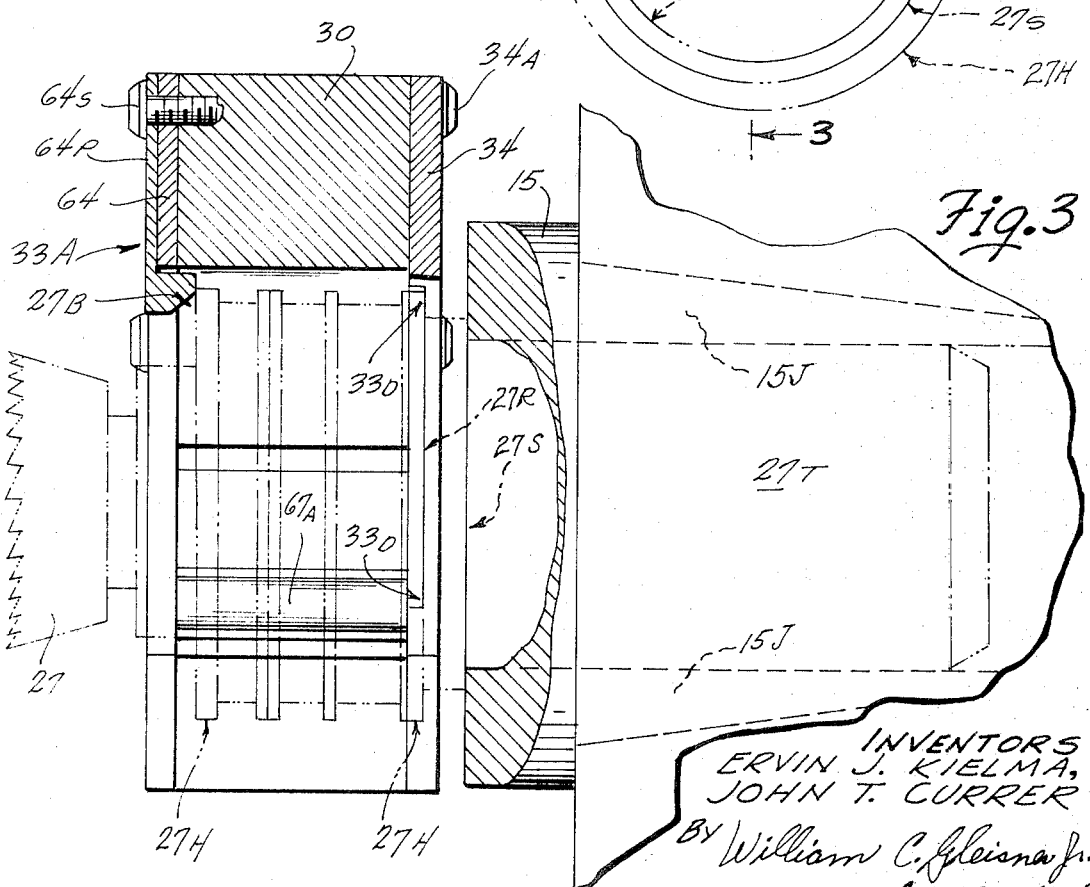

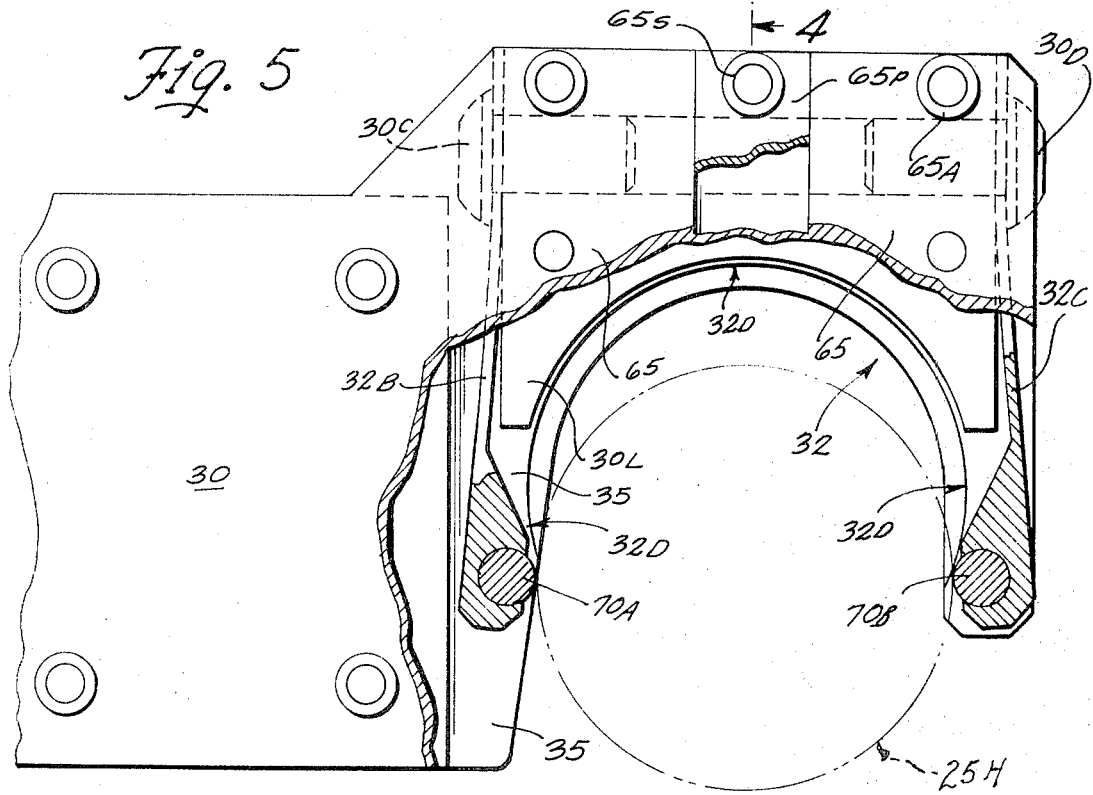
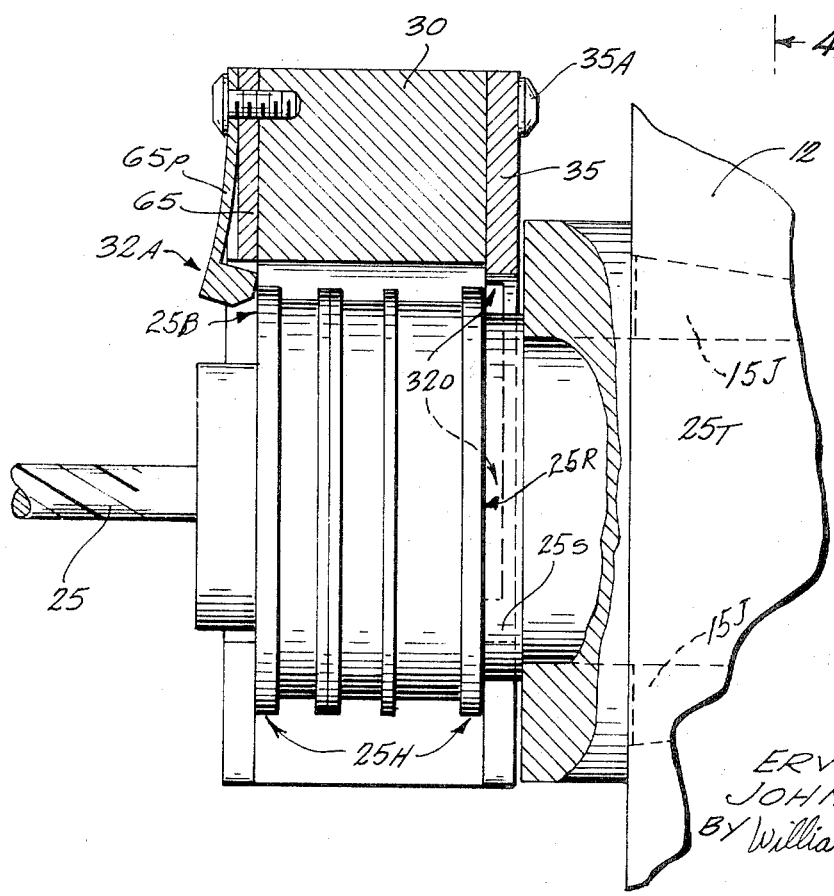

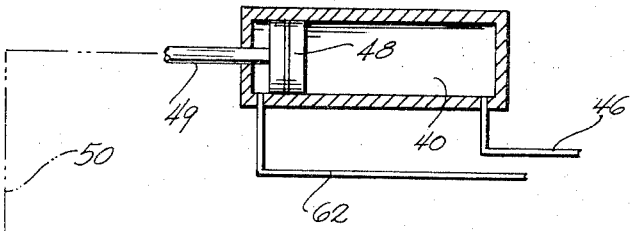
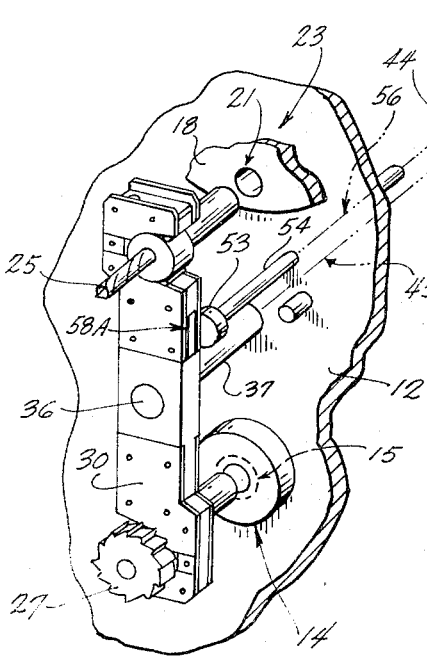
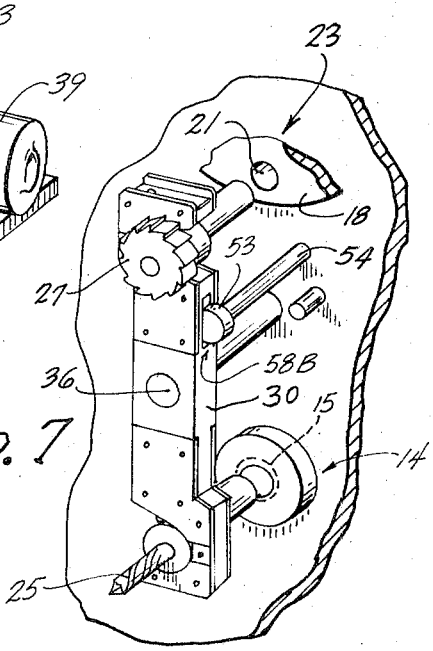
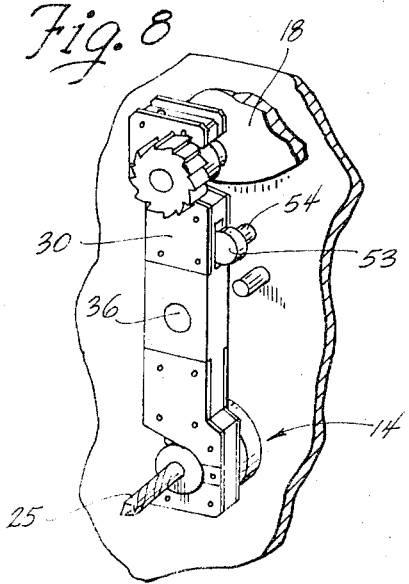
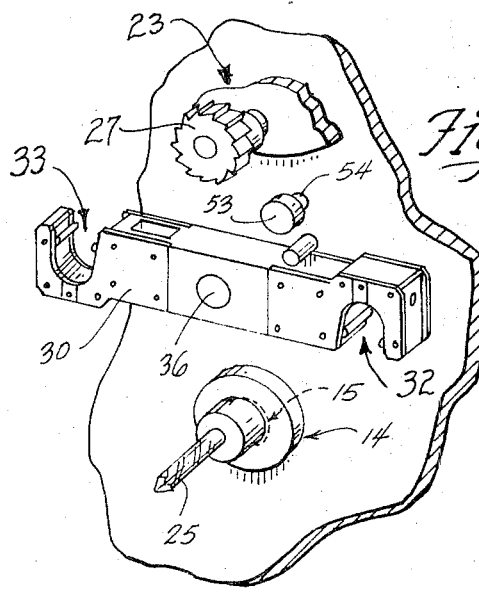

TOOL CHANGE ARM GRIP

BACKGROUND OF THE INVENTION

To provide a continuity of machining operations in machine tools, power driven tool change mechanisms have been evolved for effecting an automatic interchange between a tool stored in a magazine and a tool in a machine spindle. In one preferred form of tool changer, two spaced apart tools to be interchanged were simultaneously grasped by a single changer carrier and then simultaneously axially withdrawn from their respective sockets. Next, the axially withdrawn tools were pivoted 180°, and reinserted in the interchanged sockets. Since it was essential that tools be positively and irremovably secured to the carrier during an interchange, quite complicated releasable tool locks were provided in the opposite ends of the movable tool carrier. Although such tool locks were actuated as an incident to effecting power driven movement of the tool carrier, the actuating mechanism included extremely complex linkage internally mounted in the ends of the carrier arm for effecting positive engagement and selective disengagement.

SUMMARY OF THE INVENTION

According to this invention, there are provided new and improved clamp means for releasably and fixedly clamping a tool to a bodily movable tool change mechanism in such a manner as to positively secure the tool to the changer during bodily transfer movement between stations. Power for selectively actuating the releasable clamp means of this invention is selectively derived from the natural bodily movements of the change mechanism itself in effecting a bodily interchange of a tool between stations. It will now be assumed that a magazine tool storage socket is moved into predetermined, spaced apart parallelism to an operator socket such as that presented by a rotatable tool spindle. For the present, it will be further assumed that the spindle itself is carrying a tool having a forwardly extending circular hub or collar that is axially parallel to the spaced apart collar of a tool carried in the spaced apart storage socket.

A tool changer arm is journalled midway between the tools to be interchanged and is provided toward its opposite ends with oppositely disposed semi-circular recesses. In addition, a pair of independent resilient clamps, one lateral and one axial, is cooperatively associated with each recess. Upon initial 90° rotation of the changer arm from its central parked position, the oppositely disposed semi-circular recesses are urged into engagement with the circular collars presented by the spaced apart tools. As this occurs, the oppositely disposed lateral, resilient clamps respectively engage the spaced apart tools in a manner to laterally urge each tool into releasable clamped engagement with the associated tool engaging recess. Next, the changer arm is moved axially outward to fully withdraw the tools from the spindle socket and magazine socket respectively. Upon initial outward movement of the changer arm, spaced apart axially resilient clamps at the opposite ends of the changer resiliently urge the respective laterally clamped tools a slight distance into positive axially clamped engagement with semi-circular fixed sockets formed in the arm. Upon complete axial withdrawal of both tools, each of them is then coordinately clamped thereto by resiliently urged inward axial clamps sequentially after each of them has already been laterally clamped thereto by initial resilient operation of the lateral clamps.

As soon as the tools are fully withdrawn, the changer arm is then rotated 180° to move the tools laterally and axially clamped thereto into interchanged position for reinsertion in the respective sockets. Upon axial reinsertion of the tools in interchanged position, the respective axial and lateral clamps are resiliently reactuated in reverse sequence to completely unclamp and release the tools from the changer arm.

A general object of the invention is to provide a greatly improved mechanical lock for releasably clamping a tool to a power driven tool change mechanism of a machine tool.

Another object of the invention is to provide an improved bidirectional latch mechanism that functions automatically as an incident to sequentially coordinate movement of a lateral and axial tool change movement.

Another object of the invention is to provide in combination with a power driven, bodily movable tool change mechanism, improved releasable tool clamp means that are operative automatically as an incident to movement of the tool change mechanism.

Another object of the invention is to provide an improved releasable latch mechanism in which the cooperatively disposed parts are mounted externally of a power driven tool change carrier to facilitate inspection, adjustment and repair.

A further object of the invention is to provide in combination with a power driven tool change carrier, a clamp mechanism operatively actuated in one direction to clamp a tool to the carrier in transporting position and operatively actuated upon arrival of the carrier in the other direction to unclamp the transported tool.

A still further object of the invention is to provide a greatly simplified releasable lock mechanism for a power driven tool change mechanism.

BRIEF DESCRIPTION OF THE DRAWINGS

FIG. 2 is a fragmentary view of a tool change arm showing one semi-arcuate tool receiving recess in combination with lateral resilient tool clamps;

FIG. 3 is a fragmentary view partly in side elevation and partly in vertical section taken along the line 3—3 in FIG. 2 and showing an axial clamp;

FIG. 4 is a fragmentary view partly in side elevation and partly in vertical section along the line 4—4 in FIG. 5;

FIG. 5 is a fragmentary view in side elevation of one semi-arcuate, tool receiving recess and with some parts broken away to show the lateral clamps;

FIG. 6 is an enlarged view in perspective of the tool changer arm and showing both the rotary and axial power drives;

FIG. 7 is a fragmentary perspective view of the axially withdrawn changer arm rotated 180° to interchanged position;

FIG. 8 is a perspective view of the changer arm power actuated to a tool reinserted position;

FIG. 9 is a fragmentary perspective view of the tool change arm returned to parked horizontal position.

DESCRIPTION OF THE PREFERRED EMBODIMENT

Figure 1:
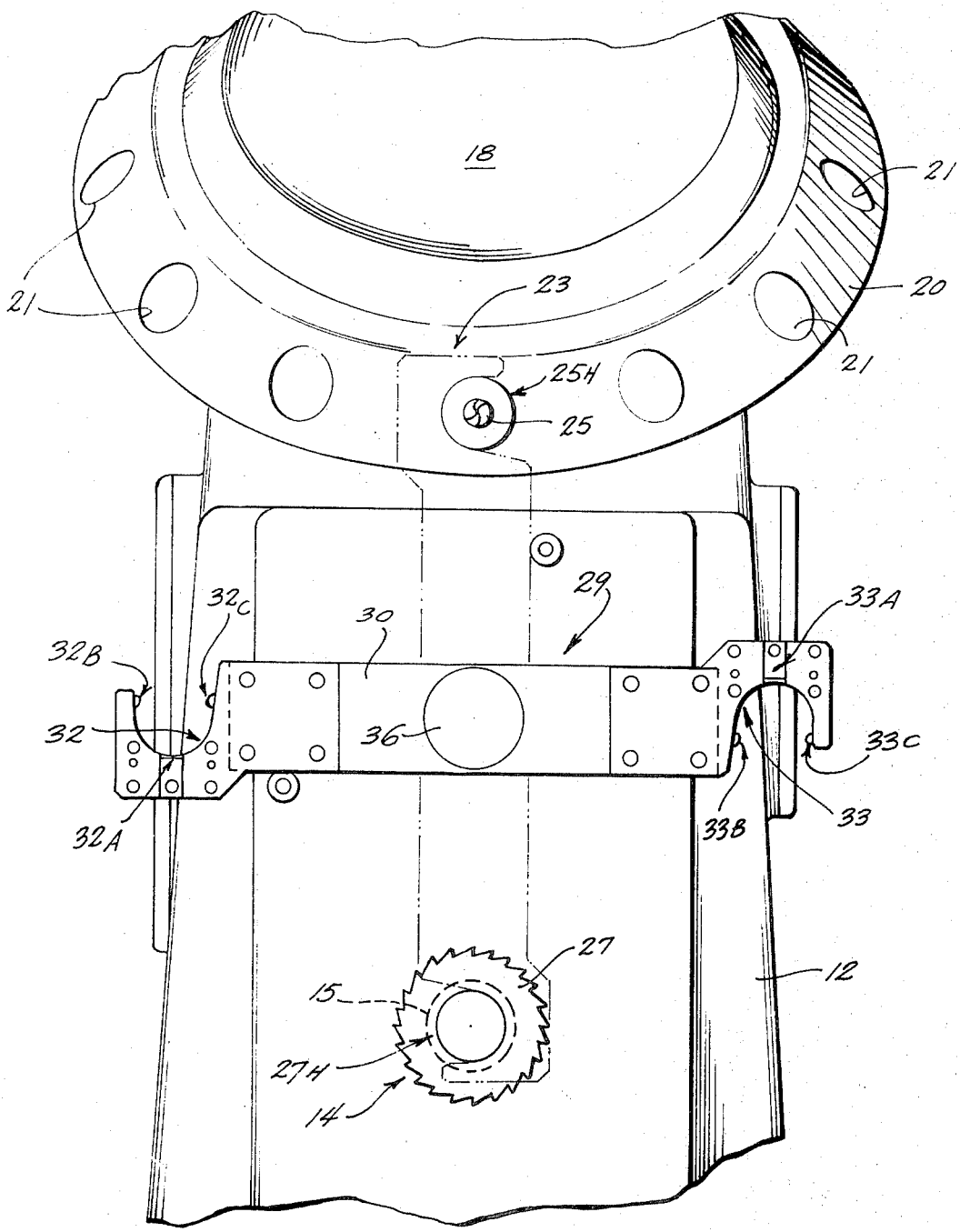
FIG. 1 is an enlarged fragmentary view in front elevation of a machine tool including a power driven tool changer incorporating the improved releasable tool clamp of the present invention.

Referring now to the drawings, a machine tool particularly adapted to incorporate the completely automatic tool clamping features of this invention is shown in FIG. 1 in enlarged fragmentary form. As is customary in machines of this type, the machine comprises a base (not shown) having a vertical column 12 in which is rotatably journalled a horizontal tool receiving spindle 14. To facilitate a power driven interchange of tools, the spindle 14 is provided with an automatic, expansible collet 15 having radially segmented jaws 15J operative in well-known manner to releasably clamp a tool in the spindle 14 for a machining operation.

Toward its upper portion, the column 12 is provided with an angularly inclined support (not shown) upon which is rotatably journalled a conical tool storage magazine or drum 18, also shown in fragmentary form in FIG. 1. Around its periphery, the storage magazine 18 is provided with a beveled edge 20 having a plurality of spaced apart bored openings 21 comprising tool receiving storage sockets. The arrangement is such that viewed collectively, both the storage sockets 21 and the tools carried thereby are disposed conically with respect to the axis of rotation of the drum 18. The arrangement is such that the conical storage drum 18 is selectively indexable to position a particular storage socket 21 in a tool change station 23 in parallel spaced position above the tool receiving spindle.

To restrain tools within the conically disposed storage sockets 21, each of the sockets is provided in well-known manner near its outer end with a resilient detent (not shown). Each toolholder (not shown) that is stored in a respective one of the magazine sockets is likewise provided in well-known manner toward its outer end with a peripheral groove resiliently engaged by the respective magazine socket detents. An associated control and source of power (not shown) is likewise connected in well-known manner to effect selective indexable movement of the conical storage magazine 18 for moving a selected storage socket 21 and tool carried thereby to the tool change station 23.

To effect an interchange of a preselected tool, such as drill 25 in the tool change station 23, with a tool, such as facemill 27 in the spindle 14, the column 12 carries for relative bodily movement a tool change mechanism that is generally identified by numeral 29. Tool change mechanism 29 comprises essentially a carrier or tool change arm 30 presenting oppositely oriented semi-circular tool gripping recesses 32, 33 at its opposite ends. The tool change arm 30 is secured at its central hub 36 to the outer end of a horizontal shaft 37 journalled in the column 12 in spaced relationship relative to the storage magazine 18 and the tool receiving spindle 15, as shown in FIGS. 1 and 6. Actually, the tool change arm shaft 37 is journalled to rotate on an axis in spaced parallelism between a tool in the spindle 14 and a tool carried by the magazine socket 21 that is positioned in the tool change station 23.

Associated with semi-circular tool gripping recess 32 are a pair of resiliently expansible lateral tool clamps 32B and 32C, as well as a cooperating resiliently expansible axial tool clamp 32A. In like manner, a pair of resiliently expansible lateral tool clamps 33B and 33C adjacent semi-circular tool engaging recess 33 cooperate with a resiliently expansible, axially operable tool clamp 33A associated therewith. As will hereinafter be explained in greater detail, the function of each pair of laterally expansible tool clamps identified by the suffixes B and C is to resiliently clamp a tool in the respectively associated semi-circular tool recesses 32 and 33 in preparation for axial clamping. After lateral clamping has been effected, resilient clamping actuation of the respective axial clamps 32A and 33A then functions to effect a slight axial displacement of the already laterally clamped tools relative to concentrically aligned semi-circular axial depressions or clamp grooves 32D and 33D shown in FIGS. 5 and 2 respectively, and concentrically formed adjacent each semi-circular recess 32 and 33. After both lateral resilient clamps and axial clamps are sequentially actuated to effect coordinate lateral and axial clamping as an adjunct of tool changing movement, the tools are positively clamped in the respective semi-circular recesses for subsequent bodily tool changing movement.

As more clearly shown in FIGS. 2 and 3, a flat plate 34 fixedly secured to the rear face of tool change arm 30 by means of cap screws, such as 34A, is provided with an enlarged semi-circular, cupshaped depression or clamp groove 33D. In like manner, as shown in FIGS. 4 and 5, a flat plate 35 fixedly secured to the rear face of tool change arm 30 by a plurality of cap screws, such as 35A, contains the fixed cup-shaped depression 32D. In both cases, it is emphasized that the semi-circular cup-shaped depressions or grooves 33D and 32D respectively formed in the fixed clamp plates 34 and 35 respectively extend beyond the center-line of the circular toolholder shoulders 27H and 25H releasably clamped therein to comprise adjacent clamp sockets.

Because of the relatively slight axial tool clamping movement effected by the cooperating resilient axial clamp 33A, as shown in FIGS. 2 and 3, however, the semi-circular axial clamp groove 33D presents a lateral opening 33T large enough to permit lateral movement of an enlarged circular shoulder 27S of the toolholder 27T for holding tool 27, but not large enough to permit lateral movement of the larger diameter toolholder shoulder 27H.

In similar manner, the lateral opening 32T between the jaws of stationary axial clamp groove 32D is sufficient to permit lateral movement of enlarged circular shoulder 25S of the toolholder 25T, adapted to releasably hold associated tool 25, as shown in FIGS. 4 and 5. In all cases, the enlarged circular toolholder shoulders, such as 25S and 27S illustrated in FIGS. 4 and 3, and presented by each of the toolholders are of a diameter large enough to abut the adjacent outer circular shoulder presented by the rotatable tool spindle 14 to effect axial positioning.

Upon lateral clamping movement being completed, the outer diameter of enlarged circular toolholder shoulders, such as 27H and 25H, are resiliently clamped in guidable and slidable engagement with semi-circular clamp recesses 33 and 32 adjacent concentric semicircular axial clamp grooves 33D and 32D. During initial lateral clamping movement, however, carrier arm 30 is being forcibly retained in axially inward parked position, as illustrated in FIG. 4, and thereby maintaining minimum clearance between the inner face of the arm 30 and the spindle 15. With these conditions existing, initial 90° pivotal movement of carrier arm 30 functions simultaneously to actuate the lateral resilient clamps, and move outer beveled toolholder shoulders such as 27B and 25B, into slidable actuating engagement with complementary inner beveled shoulders of the respective resilient axial clamps 33A and 32A.

It will be apparent, therefore, that movement of enlarged circular shoulders 27H and 25H into abutting clamped engagement with circular recesses 33 and 32 simultaneously moves the respective outer beveled shoulders 27B and 25B thereof a sufficient distance to bias associated axial clamps 33A and 32A resiliently outward to the preset positions illustrated in FIG. 4. Consequently, axial clamps 33A and 32A then are both resiliently preset to effect axial clamping movement of the respective toolholders. During such axial clamping, circular shoulders 27H and 25H slidably engage the complementary circular recesses 33 and 32. Upon completion of both resiliently urged lateral clamping and the resultant resiliently biased presetting of axial clamps 33A and 32A, conditions are then established for effecting automatic release of collet 15 to initiate the next sequential axial forward movement of carrier arm 30 for effecting axial withdrawal of the tools.

As the changer arm 30 is initially urged axially forward to begin a tool changing movement, axial clamp 33A exerts inward resilient pressure against large diameter ring 27B of the toolholder 27, thereby maintaining the inner toolholder shoulder 27R in continued abutting engagement with spindle 15. Thus abutting engagement continues until the outer face of the outwardly moving, semi-circular depressed clamp groove 33D in the outwardly moving arm 30 fully engages the larger diameter circular clamp ring 27R of the toolholder, as shown in FIG. 3. At this time, toolholder ring 27R is now axially moved into full clamped engagement with the depressed axial clamp groove 33D in the arm 30, and toolholder 27T is positively locked against lateral movement relative to the moving changer arm 30. As previously explained, toolholder 27T had already been resiliently clamped in semicircular recess 33 of tool carrier 30 by lateral clamps 33B and 33C.

Although tool carrier arm 30 contains semi-circular clamp recess 33 in concentric alignment with adjacent semi-circular depressed clamp groove 33D, it is emphasized that the wider lateral opening into principal recess 33 accommodates relative lateral movement of enlarged circular toolholder shoulder 27H simultaneously with the smaller lateral opening 33T in depressed clamp groove 33D accommodating lateral movement of shoulder 27S. As soon as relative axial clamping movement is completed, however, the enlarged circular shoulder is guided for axial movement by the associated circular recesses 33 and 32 in a manner that the concentric positioning clamp rings 27R and 25R thereof fully engage semi-circular clamp grooves 33D and 32D which then partially encircle the larger diameter rings. As already explained, this positive clamped result is due to the smaller lateral openings 33T and 32T of semi-circular clamp grooves 33D and 32D relative to the relatively larger diameter of toolholder positioning clamp rings 27R and 25R. In the preferred form of the invention illustrated, axial clamping is completed as soon as the space between the spindle and tool change arm 30 reaches the distance illustrated in FIG. 3.

Each of a plurality of different tools is releasably secured to a standard toolholder in well-known manner. As shown in FIG. 3, facemill 27 is fixedly carried by toolholder 27T that presents three different, stepped diameters including a rearward shank portion, a central positioning shoulder 27S of intermediate diameter, and an enlarged forward shoulder 27H. The enlarged forward shoulder 27H is delimited between the forward large diameter ring 27B and a concentric rearward ring 27R axially and releasably engageable in the concentric, semicircular groove 33D in tool change arm 30. Intermediate the concentrically spaced apart forward ring and rearward ring 27R are a plurality of binary coded rings to actuate a tool reader (not shown) for identifying a tool in well-known manner. Either coded tool identification for random tool selection can be provided according to the coded arrangement illustrated in U.S. Pat. No. 3,052,999, or a fixed sequential arrangement can be provided positioning a preselected tool in the tool change station 23 in FIG. 1.

As explained, both of the fixed rearward, semicircular clamp grooves 33D and 32D are disposed to respectively coact with the resilient axial clamps 33A and 32A. To this end, separate flat guide plates 64 and 65 are respectively secured to the front face of change arm 30 by means of cap screws, such as 64A and 65A, as shown in FIGS. 3 and 5. Separate, parallel grooves respectively formed in guide plates 64 and 65 guidably constrain the respective axial clamps 33A and 32A for resilient clamping movement, as clearly shown in FIGS. 3 and 4 respectively. Axial clamp 33A comprises a resilient plate or leaf spring 64P fixedly secured within the guide groove as its outer end by cap screw 64S, and having at its inner end an integrally formed beveled actuating shoulder or cam.

In like manner, FIG. 4, axial clamp 32A comprises resilient plate or leas spring 65P fixedly secured at its outer end by cap screw 65S in a manner to be resiliently movable within its guide groove, and formed at its inner end with an enlarged beveled actuating shoulder or cam. In addition to guidably supporting axial clamps 33A and 32A for movement, spaced apart front plates 64 and 65 respectively cooperate with rear plates 34 and 35 to guide the lateral clamps for resilient clamping movement, as shown in FIGS. 3 and 4.

As shown in FIG. 2, the change arm 30 is formed with a laterally extending right end portion 30R having spaced apart parallel sides to which the outer ends of lateral clamps 33B and 33C are directly secured by cap screws 30A and 30B respectively. Each of the lateral clamps 33B and 33C are thus guided for resilient movement between the respectively spaced apart parallel flat guide plates 34 and 64. Each of the resilient lateral clamps or leaf springs 33B and 33C is provided with an enlarged inner end or cam having inwardly formed, open sided bored openings disposed to receive parallel tool engaging guide rollers 67A and 67B. The opposite ends of guide rollers 67A and 67B are engaged between the inner flat faces of guide plates 34 and 64 for resiliently expansible clamping movement therebetween as a toolholder shank is moved between the rollers.

In like manner, as shown in FIG. 5, the tool change arm 30 is provided with an identically formed offset left end portion 30L having parallel sides to which are directly secured the outer ends of resilient lateral clamps or leaf springs 32B and 33C by means of cap screws 30C and 30D. The inner ends of lateral clamps 32B and 33C are thereby guided for resiliently expansible clamping movement between the opposed inner parallel faces of flat guide plates 35 and 65 secured to the leftward end of the change arm 30. Since the enlarged inner ends of resilient clamps 32B and 32C are also provided with open bored openings to receive guide rollers 70A and 70B, the latter are likewise maintained in tool engaging position between flat plates 35 and 65.

It will be apparent that lateral movement between a toolholder and a pivotal end 30R of the change arm 30 effects rolling expansible engagement of the rollers carried by a pair of spaced apart resilient clamps, with the latter exerting continued resilient clamping to maintain the associated tool in continued clamped engagement with a semi-circular tool supporting recess. Inasmuch as the sequential operation of the spaced apart lateral and axial tool clamps of this invention depend directly upon the associated tool changer, it is deemed advantageous to briefly describe the structural interconnection therewith and the mode of operation of the tool change mechanism.

Referring again to FIG. 6, bodily movements for a power driven interchange of tools between the spindle 14 and the magazine change station 23 are controlled by tool change arm drive shaft 37 being rotatably driven by one power source 39 in coordinated timed relationship with being axially driven by another separate power source 40. Both the rotary and axial power drives to the tool change arm or carrier 30 are illustrated partly in fragmentary perspective and partly in diagrammatic form in FIG. 6. As thereshown, the reversible rotary motor 39 is connected to rotate a worm 42 to drive a wormwheel 43 directly connected to drive an axially fixed output drive shaft 44. As schematically indicated by the phantom line connection 45 in FIG. 6, it will be understood the tool change drive shaft 37 has an axially splined connection to the reversibly rotatable output drive shaft 44 directly connected to be driven by motor 39.

To effect coordinate outward axial movement of change arm shaft 37, a source of pressure fluid is connected to a line 46 connected to the axial power drive 40 to move a piston 48 to its axially forward position. As schematically indicated by the phantom line connections at 50 and 56, piston rod 49 is operatively connected to urge the splined driven shaft 37 and changer arm 30 axially forward to axially withdraw the tools 25 and 27 carried thereby from the tool change station 23 and spindle 15. At the same time, a movable flanged stop 53 secured to the outer end of axially extensible stop rod 54 abuts the inner, rearward face of tool change arm 30 for hydraulically urged movement outward therewith.

In addition to effecting axial forward movement of changer arm 30, leftward axial outward movement of piston rod 49, FIG. 6, is connected via the phantom line connections 50 and 56 to urge the stop rod 54 and flanged guide stop 53 axially forward in continuous hydraulically urged abutting engagement with the inner face of the changer arm 30 during axially urged outward movement.

As soon as the tools 25 and 27 are fully withdrawn from the associated storage and spindle sockets, as shown in FIG. 6, the motor 39 is reactuated to rotate the continuously outwardly urged tool change arm 30 a full 180° in a clockwise direction to move the tools carried thereby to the realigned axial positions shown in FIG. 7. It will be noted that the changer arm 30 is provided in one edge with a guide slot 58A, FIG. 6, and with another spaced apart guide slot 58B, FIG. 7, in the opposite edge. As the tool change arm 30 is rotated from the outward vertical position shown in FIG. 6, the inner face thereof is laterally moved out of abutting engagement with the front face of the axially urged outward flanged stop 53. As this occurs, the stop 53 is then permitted to be urged axially outward a slight additional distance to the limit of its axial outward movement, due to continued input pressure via line 46. This slight additional axial movement positions the flanged stop 53 axially outward to engage the guide slot 58B in the opposite edge of the tool change arm 30, as the latter is rotationally urged to its 180° realigned vertical position, as shown in FIG. 7.

After the full axially extended flanged stop 53 engages the guide slot 58B presented by the tool change arm 30, the interchanged tools 27 and 25 are then axially aligned for insertion into magazine socket 21 and the unclamped spindle collet 15 respectively. Reinsertion of interchanged tools 27 and 25 into magazine socket 21 and spindle collet 15 is then effected by connecting hydraulic line 46 to exhaust, and simultaneously connecting the source of pressure fluid to the other line 62. Pressure fluid to line 62 urges piston 48 rightwardly in the axial power actuator 40 to urge the piston rod 49 in the same rearward direction. As schematically indicated in FIG. 6, inward axial retraction of piston rod 49 is connected via phantom lines 50, 56 and 45 to simultaneously urge stop rod 54 and change arm shaft 37 in like axially inward direction.

Reinsertion of the now interchanged tools in response to axial retraction of piston rod 49, FIG. 6, is effected by axial inward movement of the tool change arm 30 from the extended vertical position, shown in FIG. 7, to tool inserted vertical position, FIG. 8. As soon as axial tool insertion is completed, spindle collet 15 is reactivated in known manner to reclamp the interchanged drill 25 in the spindle 14. After this, rotary motor 39 is actuated in reverse direction to return tool change arm 30 from the position in FIG. 8 to horizontal parked position, FIG. 9.

The general configuration of the column 15, tool spindle 14, radially segmented automatic collet 15, conical tool storage magazine 18, and tool change mechanism shown in FIG. 1 are generally similar to the like identified parts shown and described in U.S. Pat. No. 3,218,706 entitled "Machine Tool with Tool Changer." Further, a complete cycle or sequence of independent power driven steps of the tool change mechanism 29 in effecting an interchange of tools between the conical magazine 18 and tool spindle 14 is generally similar to that described in the patent. Coordinate operation of the rotary power source 39 and axial power source 40 have been hereinbefore explained in connection with the diagrammatic perspective views of FIGS. 6 to 9 inclusive to illustrate the required rotary and axial tool change movements. Since the power drives and control movements are clearly illustrated and described, it is not deemed necessary to a complete understanding of the present invention to incorporate herein the specific control elements which conform substantially to those in the above described U.S. patent.

As additionally described in FIG. 8 of Pat. No. 3,218,706, however, the tool clamps of the prior invention require complex linkage for actuating tool clamp locks slidably interconnected within bored ways of the tool change mechanism. Although in one respect such linkage operates in similar manner to positively lock tools within semi-circular recesses as an adjunct to power driven tool changing movement, the actuating linkage itself is extremely complex and practically concealed from view within the bored ways there illustrated. Further, adjustment or repair necessitates practically complete disassembly of the entire tool change mechanism.

Prior releasable tool locks for earlier power driven tool change mechanisms were of an even more complex nature. For example, the extreme complexity of such releasable tool locking linkage is illustrated and described in connection with FIGS. 36 and 37 of the original U.S. Pat. No. 3,052,011, which is entitled "Machine Tool With a Mechanical Cutting Tool Changer" and which issued Sept. 4, 1962.

At this point it should be noted that each of the aforedescribed prior patents provide a tool change arm that is rotatable about a central axis to bodily interchange the position of spaced apart tools releasably clamped to its opposite ends. During such interchanging rotation of the carrier arm, it is emphasized that the oppositely disposed tools must be positively and irremovably locked in their respectively disposed semi-arcuate sockets. To achieve this positive locking effect, both tool changers in the prior described patents require the extremely complex interconnected linkage thereshown. Further, in all prior cases additional independently actuating movement of the associated linkage was required.

The novel transversely placed sequentially operative lateral and axial resilient tool clamps of the present invention completely obviate the requirement for the complex interconnected linkage of the prior described clamps. It will be apparent that coordinate operation of the transversely disposed lateral and axial resilient tool clamps of the present invention can be used as improved and greatly simplified tool clamping mechanism in combination with the tool change mechanisms illustrated in either of the aforedescribed patents, as well as in combination with other mechanisms requiring similar clamping movements.

Having explained in considerable detail the incidental mode of operation of the lateral resilient clamps and cooperating axial resilient clamps of this invention, the necessary independent and sequential control steps effected by the rotational power drive 39 and the cooperating axial power drive 40 occurring during one complete tool change cycle can be summarized as follows:

1. At the start of a tool change cycle, tool change arm 30 is in axial inward, horizontal parked position as shown in solid lines in FIG. 1.

2. Initially, the tool change arm 30 is rotated 90° clockwise to engage both tools as indicated in phantom lines, FIG. 1. Upon 90° engagement being completed, the lateral resilient clamps are engaged.

3. The segmented tapered spindle collet 15 is next unclamped by effecting power urged forward movement to permit axial withdrawal of tools for an interchange.

4. With lateral clamps now engaged, the change arm 30 is moved axially outward to withdraw both tools, as shown in FIG. 6. During initial axial withdrawal, both axial clamps urge the tools into axially inward clamped engagement with fixed clamp grooves 5. After both lateral and axial clamps are engaged, the axially withdrawn change arm 30 is rotated 180° in a clockwise direction to the position shown in FIG. 7.

6. With both axial and lateral clamps still engaged, the now 180° realigned tool change arm 30 is moved axially inward to insert the interchanged tools, as shown in FIG. 8, and actuate the axial clamps to disengaged position.

7. After the axial clamps are deactuated, the spindle collet 15 is reactuated by power urged rearward movement to clamped position to positively clamp the interchanged tool in the spindle; and, 8. With the axial tool change clamps now deactuated, the axially inward tool change arm 30 is returned 90° in counterclockwise direction to parked position, FIG. 9, and effecting resilient disengagement of the respective lateral clamps.

The above timing sequence can be changed to permit direct sequential actuation of axial clamps 32A and 33A to clamped position in response to clamping actuation of the lateral clamps, in which case axial outward feeding movement then effects sequential unclamping of axial clamps 32A, 33A and unclamping of the lateral clamps.

Although the illustrative embodiments of the invention have been described in considerable detail for the purpose of disclosing a practical operative structure whereby the invention may be practiced advantageously, it is to be understood that the particular apparatus described is intended to be illustrative only, and that the various novel characteristics of the invention may be incorporated in other structural forms without departing from the spirit and scope of the invention as defined in the subjoined claims.

The principles of this invention having now been fully explained in connection with the foregoing description, we hereby claim as our invention:

1. In a machine tool having a circular member and a relatively movable spaced apart carrier presenting an open circular socket adapted to releasably engage said circular member;

first resilient clamp means associated with said carrier operative to laterally clamp said circular member to said carrier upon relative lateral movement therebetween in one direction;

second resilient clamp means associated with said carrier operative to axially clamp said already laterally clamped member in said open carrier socket upon axial movement in one direction therebetween; and, power drive means sequentially operative to sequentially effect relative lateral and axial movement between said circular member and said carrier to sequentially actuate said first and second resilient clamp means for laterally and axially clamping said member to said carrier, means for reversing said power drive means to effect reverse movements of said power drive in the reverse sequence to effect relative axial movement between said circular member and said carrier first and relative lateral movement second to sequentially actuate locking means and said resilient clamping means for respectively and sequentially effecting axial and lateral unclamping of said carrier relative to said circular member.

2. In a machine tool according to claim 1 wherein said carrier is provided with a semicircular opening delineated by two adjacent carrier clamps having entry slots of different width, the latter clamp adapted to partially encircle a portion of said laterally clamped circular member upon axial movement in one direction therebetween as selectively initiated by said locking means.

3. In a machine tool having a member provided with a circular shank and a carrier for said member having an open semicircular socket adapted to releasably engage said circular shank;
   means to guidably support said member and said carrier for relative lateral and axial movement;
   first resilient means adapted to laterally urge said circular shank into lateral clamped engagement with said semicircular socket upon lateral movement in one direction between said member and said carrier;
   second resilient means adapted to axially urge said circular shank into axial clamped engagement with said semicircular socket upon axial movement in one direction between said member and said carrier;
   first power drive means connected to effect relative lateral movement between said member and said carrier in one direction to actuate said first resilient means to effect laterally clamped engagement therebetween; and,
   second power drive means connected to effect relative axial movement in one direction between said member and said carrier to actuate said second resilient means to effect axially clamped engagement therebetween.

4. In a machine tool according to claim 3 having a reverse control to actuate said second power drive means to effect reverse axial movement between said member and said carrier to actuate said second resilient means and effect axial unclamping of said circular shank; and, another reverse control operative to actuate said first power drive means to effect reverse lateral movement between said member and said carrier to actuate said first resilient means and effect lateral unclamping and complete disengagement of said member relative to said carrier.

5. In combination with a movable carrier having an axially open ended internally semicircular support presenting adjacent lateral entrance openings of large and small size with the small size opening entering into a semicircular internal recess or groove;
   a circular toolholder to be moved presenting concentric adjacent portions comprising stepped diameters of relatively large and small size respectively and simultaneously movable through said large and small lateral entrance openings presented by said semicircular support;
   means for guidably supporting said circular toolholder and said carrier in a manner that the axis of said circular toolholder is in spaced parallelism to the axis of said semicircular support;
   first power operable means connected to effect relative movement between said circular toolholder and said semicircular support in a manner that the stepped circular portions of said toolholder pass laterally through the large and small entrance openings and with said large diameter circular toolholder portion being moved into direct laterally clamped engagement with the internal semicircular tool support;
   second power operable means connected to effect axial movement of said circular toolholder to move the large circular portion thereof axially into positive locked engagement with the internal semicircular recess having the smaller lateral entrance opening so that the toolholder is positively locked against lateral movement relative to said semicircular support; and
   control means operative to effect reverse sequential operation of said second power operable means to axially unclamp the large circular toolholder portion first and then actuate said first power operable means to release the lateral clamped engagement of said toolholder from said semicircular support and then to move said toolholder laterally outward in a manner that the stepped circular portions of said toolholder pass laterally outward through the respective large and small entrance openings of said semicircular support.

6. In a machine tool having a socket adapted to releasably support a tool for transfer movement to a spaced apart position;
   a tool releasably carried by said machine socket and said tool having a transfer collar;
   a tool change arm presenting an open semicircular socket having its diameter complementary to said transfer collar and its axis parallel to the axis of said machine socket;
   first clamp means associated with said change arm socket operative to laterally clamp a tool transfer collar in said semi-circular socket upon relative lateral movement in one direction therebetween;
   second clamp means associated with said carrier socket operative to axially clamp an already laterally clamped tool transfer collar in said change arm socket upon relative axial movement in one direction therebetween; and,
   power drive means sequentially operative to effect relative lateral and axial movement between said tool change arm and said machine socket to move said change arm laterally into engagement with a tool transfer collar protruding from said machine socket for actuating said first clamp means in one direction to clamp said tool transfer collar laterally in said change arm socket and to move said carrier axially outward to axially withdraw said tool from said machine socket and actuate said second resilient means to effect axially clamped engagement of said tool transfer collar in said change arm socket.

7. In a machine tool according to claim 6 including first resilient means associated with said first clamp means and second resilient means associated with said second clamp means in such a manner that said clamps are resiliently actuated during respective lateral and axial movement of said tool change arm in response to said power drive means.

8. In a machine tool according to claim 6 including first and second leaf springs respectively secured to said tool change arm in position to support said first and second clamp means and in such a manner as to exert continued resilient pressure in both first and second directions after said power drive means is sequentially operated to effect relative lateral and axial movement of said tool change arm relative to said machine socket.

9. In a machine tool according to claim 6 including reverse control means respectively connected to effect reverse operation of said power drive means in a manner to first effect axial movement of said tool change arm and then effect lateral movement of said tool change arm in a manner that said second clamp means and said first clamp means are sequentially actuated to unclamped position in corresponding sequence.

10. In a machine tool according to claim 6 including control means selectively operative to effect reverse operation of said power drive means in a manner to effect axial and lateral movement of said tool change arm in like reverse sequence.

11. In machine means including a socket adapted to removably support a member in such position that a circular transfer collar secured to said member is spaced outwardly from said machine socket;

a carrier movably supported by said machine means and presenting an open semicircular socket complementary in diameter to said transfer collar;

first resilient means associated with said semicircular carrier socket and being operative to forcibly clamp a transfer collar into said open carrier socket upon movement therebetween in one direction;

transverse resilient means associated with said carrier socket automatically operative to transversely and forcibly clamp a transfer collar in said semicircular socket immediately upon forcible clamping therein of a transfer collar by said first resilient means; and, power drive means connected to move said carrier in one direction to urge said open semicircular socket into engagement with said transfer collar thereby effecting sequential actuation of said first and transverse resilient means associated with said carrier socket to sequentially clamp said transfer collar in first and transverse directions respectively.

12. In machine means according to claim 11 including an adjacent semicircular clamp socket concentric to said first semicircular socket but having side walls adapted to partially encircle said transfer collar, said clamp socket being positioned in spaced apart relationship to said transverse resilient means in a position to directly receive and partially encircle a transfer collar forcibly urged therein by said transverse resilient means.

13. In machine means according to claim 11 including reverse control means connected to reverse said power drive means to move said carrier in reverse direction and effect reverse unclamping movement of said transverse resilient means and said first resilient means in corresponding reverse sequence and thereby move said carrier to disengaged position.

14. In a tool transfer member for transferring tools between a tool storage magazine and a work station of a machine tool;

a grip on said tool transfer member for gripping the tools to be transferred;

means for moving said tool transfer member for moving said grip into engagement with the tools for securement thereto so that the tools may be transferred by the movement of said tool transfer member;

lateral locking means in said grip for locking a tool against lateral movement relative to said grip;

cooperating means on said tool adapted to engage said lateral locking means; and, means on said grip in position to engage a tool in said grip and urge said tool axially relative to said grip for moving said cooperating means into engagement with said lateral locking means after the tool is fully engaged by said grip so that the gripped tool cannot be dislodged laterally during its transfer movement by said tool transfer member.

15. A tool transfer member according to claim 14 wherein said lateral locking means is a recess formed in the body of said grip and said tools are provided with shanks having a plurality of diameters with said cooperating means comprising one of said diameters that is adapted to fit into said recess for locking the tool against lateral movement relative to said grip, such diameter being moved into the recess by the axial movement of the tool after the grip is in engagement with the tool.

16. A tool transfer member according to claim 15 wherein said means on said grip is a spring urging the tool in the grip axially into engagement with said recess, and including a shoulder on each of said tools for engagement with the body of the machine tool and the body of the magazine respectively when the tools are inserted in the work station and magazine respectively, such engagement of said shoulder with the machine tool and magazine serving to force the tools axially against the pressure of said spring to retain the tool out of said recess and thereby enable the tool transfer member to move said grip into and out of lateral engagement with the tools.

* * * * *